(12) United States Patent
Schwarz et al.

(10) Patent No.: US 7,762,056 B2
(45) Date of Patent: *Jul. 27, 2010

(54) AIRCRAFT COMBINATION ENGINES EXHAUST THRUST RECOVERY

(75) Inventors: Frederick M. Schwarz, Glastonbury, CT (US); Brian M. Fentress, Marlborough, CT (US); Charles E Lents, Amston, CT (US)

(73) Assignee: United Technologies Corporation, Hartford, CT (US)

( * ) Notice: Subject to any disclaimer, the term of this patent is extended or adjusted under 35 U.S.C. 154(b) by 474 days.

This patent is subject to a terminal disclaimer.

(21) Appl. No.: 11/803,432

(22) Filed: May 15, 2007

(65) Prior Publication Data

US 2009/0065652 A1    Mar. 12, 2009

(51) Int. Cl.
*F02K 3/00* (2006.01)
*F02K 7/00* (2006.01)
*F02K 9/00* (2006.01)
*F02K 99/00* (2009.01)

(52) U.S. Cl. .......................... 60/224; 60/225; 60/226.1; 60/782; 60/785; 60/262

(58) Field of Classification Search .................. 60/224, 60/225, 782, 785, 226.1, 262
See application file for complete search history.

(56) References Cited

U.S. PATENT DOCUMENTS

| 3,553,961 A * | 1/1971 | McReynolds ................ 60/280 |
| 2008/0209911 A1 * | 9/2008 | Schwarz et al. .............. 60/785 |

* cited by examiner

*Primary Examiner*—Michael Cuff
*Assistant Examiner*—Craig Kim
(74) *Attorney, Agent, or Firm*—Kinney & Lange, P.A.

(57) ABSTRACT

A gas turbine engine with a turbine with an exhaust manifold thereabout from which fluids can be transferred to the turbine and an air compressor having an air transfer duct extending therefrom so as to be capable to provide compressed air in that air transfer duct at one end thereof to the air intake of an internal combustion engine provided as an intermittent combustion engine. The air intake and an exhaust outlet are each coupled to combustion chambers therein and a rotatable output shaft is also coupled to those combustion chambers for generating force. The exhaust outlet has an exhaust transfer duct extending therefrom so as to have the intermittent combustion engine be capable to provide exhaust therefrom in that exhaust transfer duct at one end thereof, and the exhaust transfer duct being connected at an opposite end thereof to the exhaust manifold to be capable of transferring intermittent combustion engine exhaust thereto.

21 Claims, 1 Drawing Sheet

AIRCRAFT COMBINATION ENGINES EXHAUST THRUST RECOVERY

CROSS-REFERENCE TO RELATED APPLICATION

Referenced herein is U.S. application Ser. No. 11/713,262 filed Mar. 2, 2007 for "COMBINATION ENGINES FOR AIRCRAFT" by Frederick M. Schwarz, Brian M. Fentress, Andrew P. Berryann, Charles E. Lents and Jorn A. Glahn.

BACKGROUND OF THE INVENTION

The present invention relates to gas turbine engines for aircraft and, more particularly, to gas turbine engines each coupled to a corresponding auxiliary engine.

Gas turbine engines as continuous combustion, open Brayton cycle internal combustion engines have come to dominate as the power plants for larger, faster aircraft to essentially the exclusion of reciprocating engines, or internal, intermittent combustion engines, earlier used as power plants for these kinds of aircraft. This is largely because of the greater power-to-weight ratio of gas turbine engines versus internal combustion engines, especially in large horsepower engines, or, more appropriately, large thrust engines in which those large thrusts are provided with a relatively small, and so smaller drag, frontal area engine structures relative to reciprocating engines. Gas turbine engines generate such large thrusts for propulsion, or horsepower for engines with an output shaft, by combining large volumes of air with large amounts of fuel, and thereby form a jet of large velocity leading to the capability to provide desired speedy flights.

In addition to providing thrust, such gas turbine engines have operated integrated drive generators to generate electricity for the aircraft and for the engine electronic controls. The amount of electricity needed for these purposes in the past has tended to be relatively modest typically in the range of a few hundred kilowatts of electrical power but, with recently arriving new aircraft, exceeding a megawatt of power. However, there are some aircraft, usually for military uses, that have come to have needs for much larger amounts of electrical power either on a relative basis, the electrical power needed relative to the capability of the gas turbine engine available, or on an absolute basis with power needs significantly exceeding a megawatt. Furthermore, such demands for electrical power in military aircraft often occur at relatively high altitudes and often occur unevenly over relatively long time durations of use, that is, large peaks repeatedly occur in electrical power demand in the course of those long use durations.

Corresponding attempts to obtain the added power from the typical aircraft propulsive system, the gas turbine engine, that are needed to operate the concomitant much larger capacity electrical generators, either on a relative or absolute basis, will subtract significantly from the thrust output of the available turbine or turbines. Making up that thrust loss in these circumstances by operating such available turbine engines so as to increase the thrust output thereof causes the already relatively low fuel use efficiency during flight to decrease significantly, which can severely limit the length of otherwise long duration uses, and also brings those engines closer to becoming operationally unstable.

One alternative to using the gas turbine engine as the sole source of power to operate an electrical power generator is to add in the aircraft a further intermittent combustion internal combustion engine, such as gasoline engines operating on the any of the Diesel, Miller, Otto or Wankel cycles. Such engines can operate with a fuel efficiency on the order of seventy percent (70%) better than that of a continuous combustion (Brayton cycle) internal combustion gas turbine engine. At high altitudes, internal combustion engines of all kinds face the possibility of limited power output because of the relatively small air pressures there limiting the chemical reactions of oxygen with hydrogen and oxygen with carbon in the burning of the engine fuel in the engine combustion chamber or chambers. This can be solved for gas turbine engines by providing therein very large air flows through use, typically, of axial flow compressors usually in two stages with both a low compression compressor followed along the fluid flow path through the engine by a high compression compressor. This arrangement provides at least enough compressed air to the subsequent combustor to sustain the desired combustion process therein and a mass of airflow sufficient to combine with enough fuel to provide the energy needed to overcome the aircraft drag at the speed and altitude intended for operation.

However, such compressors can provide considerably more compressed air than the minimum needed for this purpose thereby allowing some of this compressed air to be delivered through an air transport duct to the air intake of an intermittent combustion internal combustion engine so that, in effect, the compressors of the gas turbine engine serve as a very capable supercharger for that intermittent combustion engine. Thus, this intermittent combustion engine can be operated at the same relatively high altitudes at which the gas turbine engine propelling the aircraft operates while this turbine engine is also supplying compressed air to that intermittent combustion engine. There, depending on the values selected for the peak air intake pressure and engine compression ratio, the intermittent combustion engine can be used as a power source for an electrical power generator that can generate much greater amounts of electrical power than can one powered by a gas turbine engine.

The intermittent combustion engine is essentially a fixed combustion chambers volume machine and in these the intake pressure is approximately equaled by the exhaust pressure (the Joule-Brayton process is a constant combustion process for which the same is true). Hence, the exhaust pressure of this intermittent combustion engine is about that of the compressed air drawn at the air intake thereof from the high pressure compressor which is, of course, quite substantial. Thus, there is a desire to recover energy from this exhaust fluid.

BRIEF SUMMARY OF THE INVENTION

The present invention provides an engine combination for generating forces having a gas turbine engine with an air inlet open to the atmosphere, an air compressor, a combustor, a turbine with an exhaust manifold thereabout from which fluids can be transferred to the turbine and an exhaust exit nozzle open to the atmosphere all positioned along a fluids flow path passing therethrough for generating force, the air compressor having an air transfer duct extending therefrom so as to be capable to provide compressed air in that air transfer duct at one end thereof. There is further an internal combustion engine provided as an intermittent combustion engine having an air intake and an exhaust outlet each coupled to combustion chambers therein and a rotatable output shaft also coupled to those combustion chambers for generating force, the air transfer duct being connected at an opposite end to the air intake to be capable of transferring compressed air thereto, the exhaust outlet having an exhaust transfer duct extending therefrom so as to have the intermittent combustion engine be capable to provide exhaust therefrom in that exhaust transfer duct at one end thereof, and the exhaust transfer duct being connected at an opposite end thereof to the exhaust manifold to be capable of transferring intermittent combustion engine exhaust thereto.

DETAILED DESCRIPTION

Figure 1:
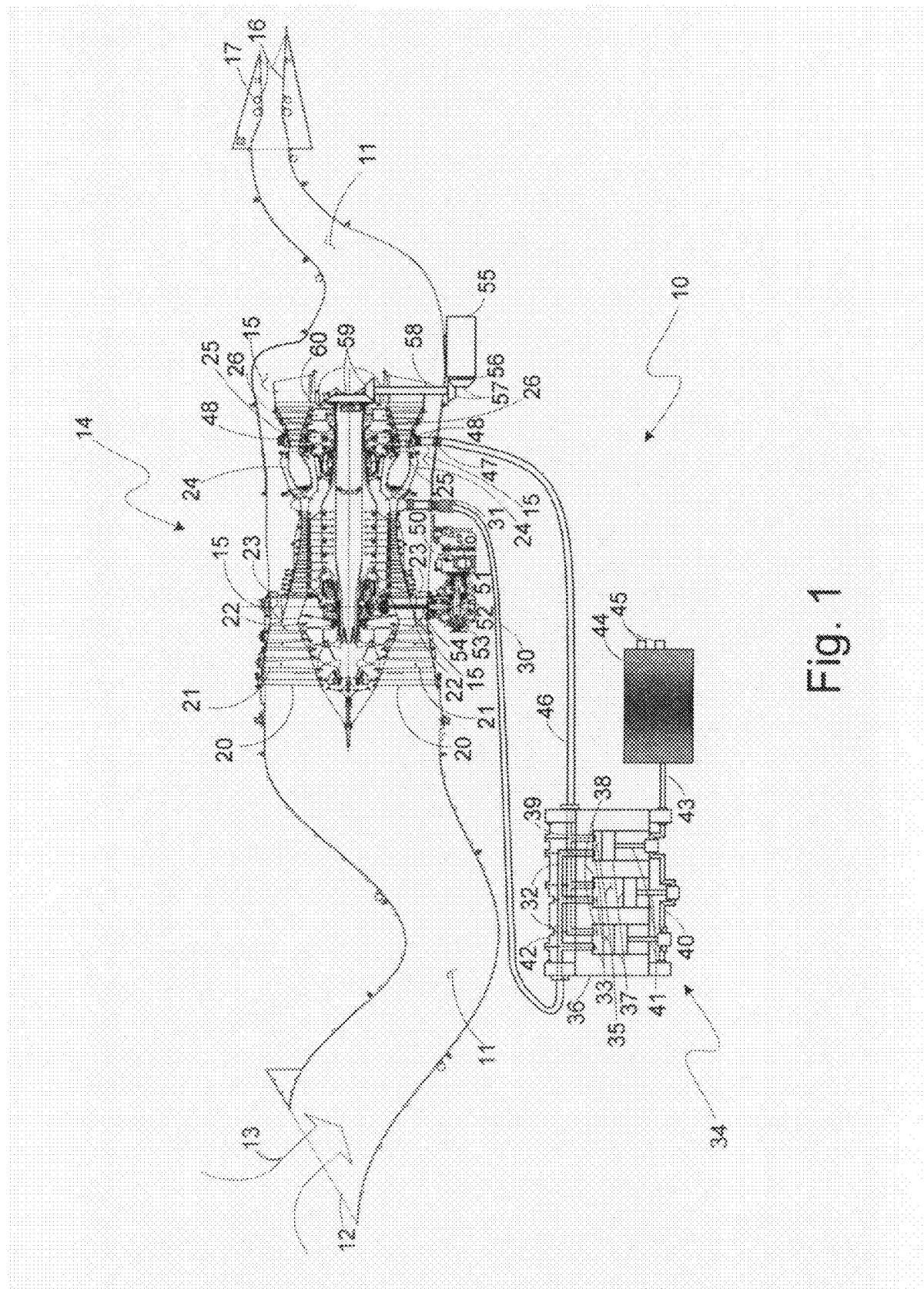
FIG. 1 is a schematic representation of a cross section side view of a portion of an aircraft embodying the present invention.

The intermittent combustion engine can be used to provide some added electrical power through having the exhaust therefrom directed through an exhaust turbine provided therefor to rotate an input shaft of a further secondary electrical power generator, but it can also instead have the exhaust therefrom used to increase the thrust of the gas turbine engine. This additional thrust can be obtained by distributing the intermittent combustion engine exhaust through an exhaust duct to a manifold affixed to, and typically symmetrically about the fluid flow centerline of, the turbine case in the turbofan engine. This exhaust flows from this manifold into the fluid flow path through the encased high pressure turbine of the turbofan engine from locations substantially evenly distributed about this fluid flow path by that manifold. The injection locations of this intermittent combustion engine exhaust gas into the turbofan engine high pressure turbine must be ones where the pressure of that exhaust always exceeds the fluid pressure in the turbine there and, typically, these locations are at the second vane of the high pressure turbine.

The effect of the turbofan engine supplying compressed air to effectively supercharge the intermittent combustion engine is that the pressure of the exhaust gas therefrom at the beginning of the exhaust portion of the intermittent combustion engine operating cycle is relatively large. This is especially so if the aircraft with these engines is at a very high altitude where ambient atmospheric pressures may be 3 $lbs/in^2$ absolute or less. In the Otto and Diesel cycle engines, for instance, the piston intake stroke in the intake portion of the operating cycle just as the intake valve closes leaves the combustion chamber with the same volume that it left by the piston exhaust stroke in the exhaust portion of the cycle just as the exhaust valve opens, and the fluids in the chamber on those occasions have about the temperature and mass. Hence, the exhaust is at about the same large pressure as was the previous incoming compressed air, and so this exhaust is a potentially source of a substantial amount of energy for generating thrust to well warrant the provision of such an exhaust duct and manifold as was described above.

FIG. 1 shows a schematic representation of a cross section side view of a portion of an aircraft with an example of such a gas turbine engine and intermittent combustion engine combination, 10, in an arrangement in which most of the aircraft structure in which they are positioned has been omitted from this view. However, there is at least a portion of an engine duct, 11, in that aircraft that is shown and has an air inlet, 12, facing forward in the aircraft. The configuration shown for duct 11, with its somewhat sinuous shape, is from a stealth type military aircraft, several kinds of which are unmanned aircraft. This duct first curves downward, coming from the front of the aircraft at the duct opening provided by air inlet 12 to the atmosphere from which an airstream, 13, is drawn. The duct then curves upward to open to a gas turbine engine provided as a turbofan engine, 14, in engine duct 11 which uses airstream 13 for combustion and for fan forced air propulsion purposes. This passageway curvature of duct 11 past air inlet 12 serves to hide the front of engine 14 from impinging electromagnetic radiation at various wavelengths. Outer portions, 15, of duct 11 adjacent engine 14 past a splitter convey the fan forced air provided by engine 14 for propulsion purposes into the remainder of duct 11 past engine 14 toward the outlet of duct 11 to the atmosphere as will be described below.

This fan forced air and the combustion products resulting from combustion in engine 14 are forced out of the remainder of engine duct 11 to an exit nozzle, 16, serving as the outlet of duct 11. A fluid actuation system, 17, provides the force to partial open and close nozzle 16 during the operation of turbofan engine 14. Again, duct 11 past engine 14 first curves downward, coming from that engine, and then the duct curves upward to open to nozzle 16. Here, too, this passageway curvature of duct 11 past engine 14 serves to hide the rear of engine 14 from electromagnetic radiation at various wavelengths impinging at the rear of the aircraft.

Engine 14 has an air inlet guide vane, 20, followed by a high pressure fan, 21, as the fan for the turbofan engine to force air outside and past a splitter, 22, and then through duct portions 15 into the rear of duct 11 and out of that duct through nozzle 16 to exit to the atmosphere. In addition, high pressure fan 21 also serves as a low pressure air compressor through delivering compressed air inside splitter 22 to a high pressure air compressor, 23. The compressed air from high pressure compressor 23 arrives at a combustor, 24, to which fuel is also delivered and burned. The combustion products form a jet of fluid which impinges first on a high pressure turbine, 25, and then on a low pressure turbine, 26, to cause them to rotate which, through appropriate mechanical linkings, leads to high pressure compressor 23 and high pressure fan 21 being forced thereby to also rotate. The combustion products then reach the remainder of duct 11 past engine 14 to exit through nozzle 16 to the atmosphere.

A compressed air conveyance duct, 30, is connected at one end into turbofan engine 14 to receive compressed air from high pressure compressor 23 through a compressed air flow control valve, 31, typically controlled by a system computer or controller (not shown but typically an engine control computer or an aircraft systems computer either eliminating the need for such an engine control computer or operating with it in a distributed control system), and used to control the flow of compressed air from high pressure compressor 23 through duct 30. The opposite end of duct 30 is connected to an air intake, or intake manifold, 32, leading to engine air intake valves, 33, for an intermittent combustion engine, 34, represented in the example of FIG. 2 as a Diesel or Otto cycle engine. Intermittent combustion engine 34 is shown positioned forward in the aircraft of turbofan engine 14 to shift the center of mass of the aircraft forward to counter some of the weight of engine 14 but other positions are possible to be used if desired.

Valves 33 in engine 34 control the air taken into combustion chambers, 35, bounded by an engine block, 36, providing the basic structure of engine 34 and by pistons, 37. Each chamber also has an exhaust valve, 38, through which combustion products are exhausted to an exhaust manifold, 39. A rotatable crankshaft, 40, has a connecting rod, 41, rotatably coupling it to a corresponding one of each of pistons 37. A rotatable camshaft, 42, is used to open and close air intake valves 33 and exhaust valves 38 in a suitable sequence.

Crankshaft 40, under the control of a system controller not shown, is rotated by the force on pistons 37 transmitted thereto by corresponding ones of connecting rods 41 due to repeated combustion events in the corresponding combustion chamber 35 which events occur in all of chambers 35 in a suitable sequence before repeating. These events correspondingly use the air quantities taken through valves 33 repeatedly into, and the fuel quantities repeatedly injected into, those chambers for combustion. The fuel quantities are injected by a fuel injection system not seeable in this FIGURE and the magnitudes thereof are used to select the mechanical power output of crankshaft 40 of the intermittent combustion engine. The resulting combustion products are correspondingly repeatedly rejected from those chambers through valves 38. If an Otto cycle engine is used as intermittent combustion engine 34, the combustion events are initiated by the repeated sparkings of spark plugs not shown in this FIGURE in a suitable sequence across combustion chambers 35 under the control of the system controller. In addition, intermittent combustion engine 34 has a cooling system not shown for cooling the engine structure about combustion chambers 35.

The rotation of crankshaft 40 is suitably fastened to an input shaft, 43, of a primary electrical power generator, 44. The resulting rotation of input shaft 43 electrically energizes output electrical conductors, 45, of generator 44 to thereby generate the desired electrical power thereat for operating aircraft devices (not or not all shown). The demand for electrical power in the aircraft is used as a basis to select the fuel quantities injected in the combustion chambers of the intermittent combustion engine to have that engine supply sufficient mechanical power crankshaft 40 to sufficiently rotate input shaft 43 of generator 44 to meet that demand.

An exhaust duct, 46, extends from exhaust manifold 39 of intermittent combustion engine 34 to a passthrough connection, 47, in the engine nacelle wall which is connected to an exhaust manifold, 48, shaped similar to a toroidal shell which is affixed in the engine to the wall about the high pressure turbine. Openings extend from the interior of manifold 48 through this wall so that intermittent combustion engine exhaust impinges on the vanes and blades of that turbine to thereby aid in causing it to rotate.

A supplemental electrical power generator is provided in this example by operating an electrical starter (generator), 50, with the electrical motor therein operated also as an electrical generator after the completion of the starting process. Starter (generator) 50 rotates high pressure air compressor 23 to start turbofan engine 14 and, thereafter, with engine 14 operating, this compressor can selectively rotate the rotor in starter (generator) 50 to cause the starter motor to be operated as an electrical power generator.

Starter (generator) 50 has a drive (input) shaft, 51, extending from the rotor therein to a set of bevel gears, 52, with the bevel gear on the opposite side of this set rotatably coupled to a clutch, 53. Clutch 53 allows the system computer to engage and disengage starter (generator) 50 as appropriate. The opposite side of clutch 53 has a engagement shaft, 54, extending therefrom ending in bevel gear rotatably engaged with a counterpart bevel gear in a portion of high pressure air compressor 23.

A further supplemental electrical power generator, 55, is shown in FIG. 1 for this example which has an input shaft, 56, extending from the rotor therein to a set of bevel gears, 57, with the bevel gear on the opposite side of this set rotatably coupled to a shaft, 58, which in turn is coupled to a further set of bevel gears, 59. These bevel gears are coupled to an output shaft of low pressure turbine 26 through a clutch, 60. Clutch 60, here too, allows the system computer to engage and disengage generator 55 as appropriate.

Although the present invention has been described with reference to preferred embodiments, workers skilled in the art will recognize that changes may be made in form and detail without departing from the spirit and scope of the invention.

The invention claimed is:

1. An engine combination for generating forces, the engine combination comprising:
    a gas turbine engine having an air inlet open to the atmosphere, an air compressor, a combustor, a turbine with an exhaust manifold thereabout from which fluids can be transferred to the turbine and an exhaust exit nozzle open to the atmosphere all positioned along a fluids flow path passing therethrough for generating force, the air compressor having an air transfer duct extending therefrom so as to be capable to provide compressed air in that air transfer duct at one end thereof; and
    an internal combustion engine provided as an intermittent combustion engine having an air intake and an exhaust outlet each coupled to combustion chambers therein and a rotatable output shaft also coupled to those combustion chambers for generating force, the air transfer duct being connected at an opposite end to the air intake to be capable of transferring compressed air thereto, the exhaust outlet having an exhaust transfer duct extending therefrom so as to have the intermittent combustion engine be capable to provide exhaust therefrom in that exhaust transfer duct at one end thereof, and the exhaust transfer duct being connected at an opposite end thereof to the exhaust manifold to be capable of transferring intermittent combustion engine exhaust thereto.

2. The combination of claim 1 further comprising a control valve at least partially in the air transfer duct which can be selectively directed to open more or close more to thereby selectively affect the passage of compressed air through the air duct.

3. The combination of claim 1 further comprising a primary electrical generator having a rotatable input shaft mechanically coupled through a coupler to the intermittent combustion engine output shaft and having an output conductor, the output conductor being electrically energized in response to rotation of the input shaft.

4. The combination of claim 1 further comprising a supplemental electrical generator having a rotatable input shaft coupled through a coupler to the turbine of the gas turbine engine, the supplemental electrical generator having an output conductor which is electrically energized in response to rotation of the input shaft thereof.

5. The combination of claim 4 further comprising a clutch as part of the coupler which can be selectively directed to engage or disengage to thereby selectively complete the coupling to cause the supplemental electrical generator input shaft to be rotated.

6. The combination of claim 1 further comprising an electrical starter having a rotatable operation shaft coupled through a coupler to the air compressor of the gas turbine engine such that the starter can be selectively directed to rotate a rotor in the air compressor or to have a rotor in the starter to be rotated by the air compressor to generate electrical power.

7. The combination of claim 6 further comprising a clutch as part of the coupler which can be selectively directed to engage or disengage to thereby selectively complete the coupling to allow the starter to be selectively directed to rotate a rotor in the air compressor or to allow a rotor in the starter to be rotated by the air compressor.

8. The combination of claim 1 wherein the intermittent combustion engine is positioned at least in part forward of the gas turbine engine in an aircraft propelled by the gas turbine engine.

9. The combination of claim 1 wherein the engine combination is in an aircraft propelled by the gas turbine engine that is a turbofan engine.

10. A method of generating force and electrical power using an engine combination of a gas turbine engine having an air inlet open to the atmosphere, an air compressor, a combustor, a turbine with an exhaust manifold thereabout from which fluids can be transferred to the turbine and an exhaust exit nozzle open to the atmosphere all positioned along a fluids flow path passing therethrough and of an internal combustion engine provided as an intermittent combustion engine having an air intake and an exhaust outlet each coupled to combustion chambers therein, a fuel system coupled to those combustion chambers and a rotatable output shaft also coupled to those combustion chambers, there being an air transfer duct extending from the air compressor to the air intake to transfer compressed air to the air intake from the air compressor and there being an exhaust transfer duct extending from the exhaust outlet to the exhaust manifold to transfer exhaust to exhaust manifold from the intermittent combustion engine, the method comprising:
- operating the gas turbine engine to establish a combustion products flow out the exhaust exit nozzle;
- distributing air compressed in the air compressor of the gas turbine engine to the air intake of the intermittent combustion engine; and
- distributing exhaust generated in the intermittent combustion engine to the exhaust manifold.

11. The method of claim 10 further comprising a control valve between the air compressor and the air intake which can be selectively directed to open more or close more to thereby selectively affect the passage of compressed air through the air duct with the engine combination being in an aircraft, and altering the amount of compressed air passing to the air intake based at least in part on the altitude of the aircraft.

12. The method of claim 10 further comprising an electrical power generator having an input shaft coupled to the output shaft of the intermittent combustion engine with the electrical power generator having output conductors which are electrically energized by rotating the input shaft, and selecting quantities of fuel to be injected into the combustion chambers of the intermittent combustion engine based at least in part on the demand for electrical power at the output conductors of the electrical power generator.

13. The method of claim 10 further comprising the intermittent combustion engine having an exhaust manifold coupled to combustion chambers therein, a turbine with an output shaft positioned at an output of the exhaust manifold, and an electrical power generator having an input shaft coupled to the output shaft of the turbine with the electrical power generator having output conductors which are electrically energized by rotating the input shaft thereof, and directing combustion products provided by the intermittent combustion engine in the exhaust manifold during its operation through the output of the exhaust manifold to impinge on the turbine.

14. The method of claim 10 further comprising an electrical power generator having an input shaft and output conductors which are electrically energized by rotating the input shaft thereof with the input shaft coupled through a clutch to a selected one of the air compressor and the turbine in the gas turbine engine, and selectively engaging and disengaging the clutch to cause the input shaft to rotate or not.

15. A power generation system for propelling, and generating electrical power in, an aircraft, the system comprising:
- a turbofan engine in an engine compartment in the aircraft with an air inlet in the aircraft open to the atmosphere and leading to an air compressor in the turbofan engine followed by a combustor, a turbine with an exhaust manifold thereabout from which fluids can be transferred to the turbine and an exhaust exit nozzle open to the atmosphere, the air compressor having an air transfer duct extending therefrom so as to be capable of providing compressed air therein and to the combustor;
- an internal combustion engine provided as an intermittent combustion engine in the aircraft having an air intake and an exhaust outlet each coupled to combustion chambers therein, a rotatable output shaft also coupled to those combustion chambers for generating force, and a fuel system for providing fuel to those combustion chambers, the air transfer duct being connected to the air intake to transfer compressed air thereto, the exhaust outlet having an exhaust transfer duct extending therefrom so as to have the intermittent combustion engine be capable to provide exhaust therefrom in that exhaust transfer duct at one end thereof, and the exhaust transfer duct being connected at an opposite end thereof to the exhaust manifold to be capable of transferring intermittent combustion engine exhaust thereto, and
- a primary electrical generator in the aircraft having a rotatable input shaft mechanically coupled through a coupler to the intermittent combustion engine output shaft and having an output conductor with the output conductor being electrically energized in response to rotation of the input shaft.

16. The combination of claim 15 further comprising a control valve at least partially in the air transfer duct which can be selectively directed to open more or close more to thereby selectively affect the passage of compressed air through the air duct.

17. The combination of claim 15 wherein the aircraft is an unmanned stealth type aircraft.

18. The combination of claim 17 wherein the intermittent combustion engine is positioned at least in part forward of the gas turbine engine in an aircraft propelled by the turbofan engine.

19. The combination of claim 15 further comprising a supplemental electrical generator having a rotatable input shaft coupled through a coupler to the turbine of the turbofan engine, the supplemental electrical generator having an output conductor which is electrically energized in response to rotation of the input shaft thereof.

20. The combination of claim 19 further comprising a clutch as part of the coupler which can be selectively directed to engage or disengage to thereby selectively complete the coupling to cause the supplemental electrical generator input shaft to be rotated.

21. The combination of claim 15 further comprising the aircraft having selectively operated electrical power consumption devices therein electrically connected or connectable to the output conductor of the primary electrical generator to receive electrical power therefrom.

* * * * *